United States Patent [19]

Witteman et al.

[11] 4,185,255
[45] Jan. 22, 1980

[54] SET-UP FOR A TRANSVERSELY EXCITED LASER OPERATING AT ATMOSPHERIC PRESSURE

[75] Inventors: Wilhelmus J. Witteman; Bernard J. Reits, both of Hengelo, Netherlands

[73] Assignee: Stichting Voor Fundamenteel Onderzoek der Materie, Utrecht, Netherlands

[21] Appl. No.: 799,604

[22] Filed: May 23, 1977

[30] Foreign Application Priority Data

Jun. 3, 1976 [NL] Netherlands ............................ 7605991

[51] Int. Cl.² .............................................. H01S 3/097
[52] U.S. Cl. ............................................ 331/94.5 PE
[58] Field of Search ................. 331/94.5 PE, 94.5 D, 331/94.5 G Primary Examiner—William L. Sikes
Attorney, Agent, or Firm—Watson, Cole, Grindle & Watson

[57] ABSTRACT

A high power pulsed laser set-up comprising a laser-tube and a generator, screened at least transversely from the environment, by a housing that forms a conductor for one of the electrodes of the tube.

4 Claims, 2 Drawing Figures

SET-UP FOR A TRANSVERSELY EXCITED LASER OPERATING AT ATMOSPHERIC PRESSURE

BACKGROUND OF THE INVENTION

The invention relates to an improvement in the construction of a high power pulsed laser set-up, comprising a laser tube with substantially uniform field electrodes, with trigger means, with a generator connected to the said electrodes and with a resistor in one of the conductors to the electrodes.

Such a set-up is known in the art. In this set-up known in the art the laser tube and the generator are independent units, which are interconnected by conductors. It has been found that such a set-up sets limits to both input energy per volume-unit of the tube and to the efficiency with which this energy is converted into pulses in the tube.

SUMMARY OF THE INVENTION

The object of the invention is to raise these limits and, therefore, it is characterized in that, at least transversely, the generator and the laser tube together are screened from the environment by a housing that forms a conductor for one of the electrodes of the tube.

It was found that by applying the invention, the input energy and the efficiency of conversion could be raised.

The invention yields to a very fast circuit, because the circuit has a very low self-induction with respect to the circuits known in the art. This might be an explanation for the improvement.

In a specific embodiment of the set-up according to the invention the tube is symmetrically attached on top of the generator. As a result of this set-up a substantially induction-free room has been created in the housing and so near and in the tube, as a result of which the influence on the gas in the tube of the current through the conductors has been greatly reduced.

The invention will now be elucidated by means of a drawing with two Figures.

BRIEF DESCRIPTION OF THE DRAWINGS

In the drawing

In the Figures like ciphers and letters refer to corresponding elements.

In FIG. 1 cavity resonator 1 of laser tube 2 is provided with electrodes 3, 4 with Rogowski profiles. Via conductors 5, 6 electrodes 3, 4 are connected with a generator unit 7.

Figure 1:
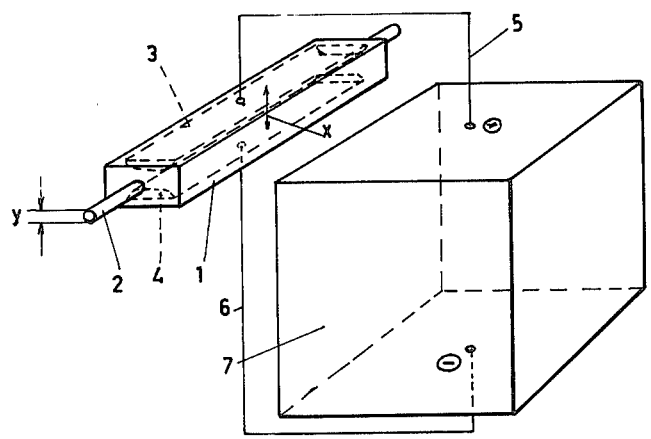
FIG. 1 represents a laser set-up known in the art and FIG. 2 a set-up according to the invention.

It has been found that with a set-up as is shown in FIG. 1, limits have been set to the input energy per liter of cavity resonator, which manifests itself in a maximum discharge height X, which is approximately 6.5 cm.

Figure 2:
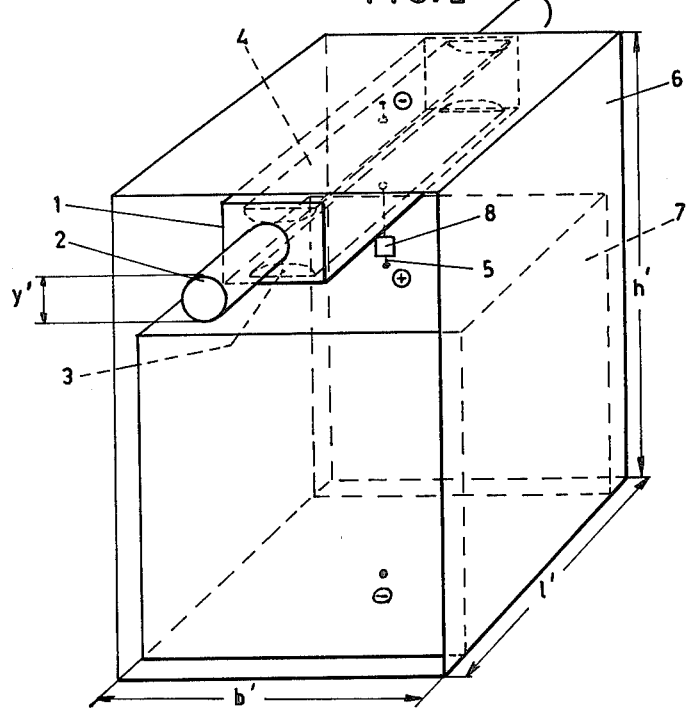

By designing, as shown in FIG. 2, conductor 6 as a housing and as a result with a very low self-induction, in combination with a very short conductor 5, a very fast circuit was realized, which was found to be a condition for a rise in the values of the above limits.

This effect may be furthermore increased by applying a generator 7 with a higher output voltage at a constant output energy. Such a generator 7 has lower capacities and as a result a smaller RC-constant. This RC-constant can be adapted to cavity resonator 1 with the aid of a copper sulphate resistor 8 in conductor 5.

In the embodiment of the invention as has been shown in FIG. 2

| | | |
|---|---|---|
| generator 7 is: | a marx generator peak voltage 240 kV energy 2,400 Joules | |
| resistor 8 is: | 20 Ohms | |
| laser tube 2: | diameter y' 15 cm | |
| cavity resonator l × b × h | $100 \times 50 \times 10$ cm$^3$ | |
| discharge length: | 60 cm | |
| discharge breadth: | 10 cm | |
| discharge height X = | 10 cm | |
| screen 6 | Cu thickness | 0.1 cm |
| | length l' | 100 cm |
| | breadth b' | 70 cm |
| | height h' | 120 cm |

We claim:
1. In a pulsed laser, including
a cavity resonator;
a pair of spaced substantially uniform field electrodes extending along said resonator;
a laser tube mounted within said resonator;
a generator for energizing said electrodes, and
means for interconnecting said generator to said electrodes the improvement comprising an electrically conductive housing enclosing said resonator cavity and said generator, said housing being attached to one of said electrodes thereby forming a conductor for one of said electrodes to provide a low-inductance connection thereto.

2. A pulsed laser as in claim 1 further comprising a resistor electrically connected in series between one of said electrodes and said interconnecting means.

3. A pulsed laser as in claim 2 wherein said laser tube is symmetrically mounted on top of said generator within said housing.

4. A pulsed laser as in claim 1 wherein said laser tube is symmetrically mounted on top of said generator within said housing.

* * * * *